United States Patent
Kumar

(10) Patent No.: US 10,044,263 B2
(45) Date of Patent: Aug. 7, 2018

(54) USING PMOS POWER SWITCH IN A COMBINATION SWITCHING AND LINEAR REGULATOR

(71) Applicant: Microchip Technology Incorporated, Chandler, AZ (US)

(72) Inventor: Ajay Kumar, Phoenix, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 135 days.

(21) Appl. No.: 15/066,879

(22) Filed: Mar. 10, 2016

(65) Prior Publication Data
US 2016/0268885 A1   Sep. 15, 2016

Related U.S. Application Data

(60) Provisional application No. 62/132,001, filed on Mar. 12, 2015.

(51) Int. Cl.
G05F 1/56 (2006.01)
H02M 3/156 (2006.01)
H02M 1/00 (2006.01)

(52) U.S. Cl.
CPC .... *H02M 3/156* (2013.01); *H02M 2001/0045* (2013.01)

(58) Field of Classification Search
CPC .................................................. H02M 3/156
USPC .................................................. 323/270–286
See application file for complete search history.

(56) References Cited

U.S. PATENT DOCUMENTS

| | | | | |
|---|---|---|---|---|
| 4,837,495 A | * | 6/1989 | Zansky | H02M 3/156 323/222 |
| 6,229,289 B1 | | 5/2001 | Piovaccari et al. | 323/268 |
| 7,906,943 B2 | * | 3/2011 | Isobe | H02M 3/156 323/223 |
| 2006/0284607 A1 | * | 12/2006 | Isobe | H02M 3/156 323/282 |

OTHER PUBLICATIONS

International Search Report and Written Opinion, Application No. PCT/US2016/021911, 10 pages, dated Jun. 22, 2016.

* cited by examiner

*Primary Examiner* — Adolf Berhane
*Assistant Examiner* — Nusrat Quddus
(74) *Attorney, Agent, or Firm* — Slayden Grubert Beard PLLC

(57) ABSTRACT

A P-MOS transistor may be used as either a switch in a DC-DC converter or as a pass transistor of a linear regulator. When a supply voltage is above a certain voltage, the P-MOS transistor will be used in the DC-DC converter and when below the certain voltage the P-MOS transistor will be used in the linear regulator. The supply voltage may be monitored with a voltage comparator that compares the supply voltage to the certain voltage. Above the certain voltage the DC-DC converter is more efficient than the linear regulator and below the certain voltage the linear voltage regulator is more efficient than the DC-DC converter. Alternatively, selecting either the DC-DC converter or linear regulator may be done by using bonding, a jumper, a fuse link or programming a bit for different product applications during integrated circuit package fabrication or end product manufacturing.

21 Claims, 3 Drawing Sheets

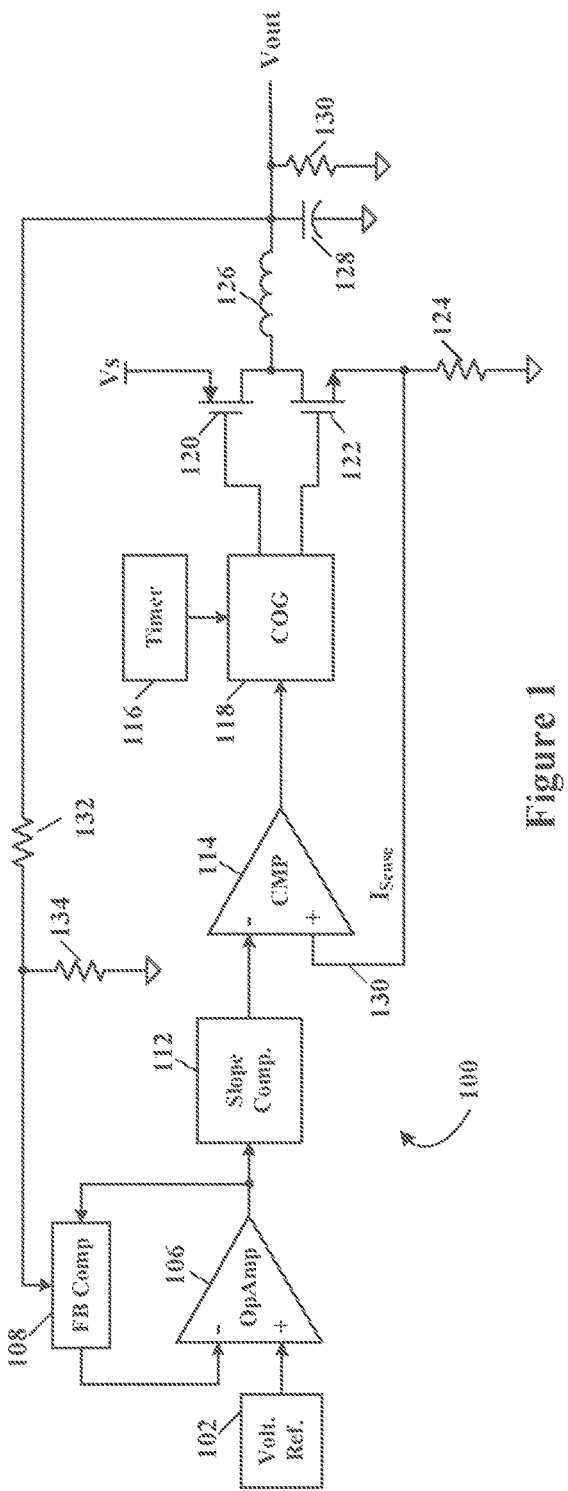
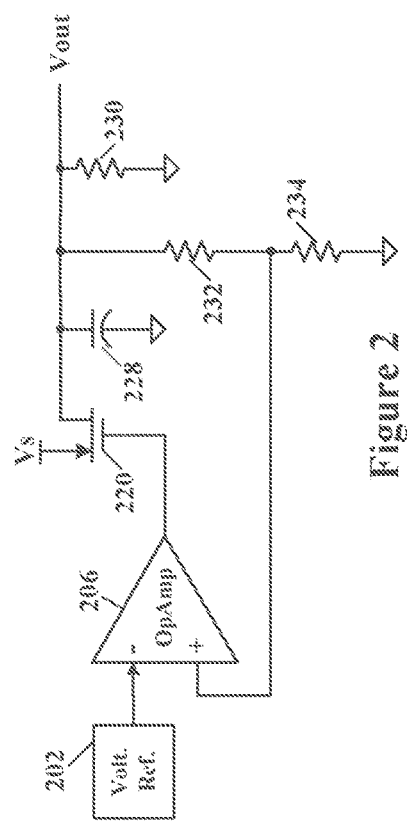
Figure 1
Figure 2

USING PMOS POWER SWITCH IN A COMBINATION SWITCHING AND LINEAR REGULATOR

RELATED PATENT APPLICATION

This application claims priority to commonly owned U.S. Provisional Patent Application No. 62/132,001 filed Mar. 12, 2015; which is hereby incorporated by reference herein for all purposes.

TECHNICAL FIELD

The present disclosure relates to integrated circuit voltage regulators, and, more specifically, using a common PMOS power transistor for both switching and linear regulators based upon s source voltage value.

BACKGROUND

DC-DC converters are generally used to provide a highly efficient regulation of a DC supply voltage. The efficiency of a DC-DC converter drops when the supply-voltage is reduced. There is a point where a linear voltage regulator becomes more efficient than a DC-DC converter. Thus, in order to have optimal efficiency across an entire wide supply voltage range, for example 1.43-3.63 Volts, both a DC-DC converter and a linear regulator may be placed side by side. But both require a large area of silicon real estate and a majority of their areas are taken up by the power pass-transistors. This makes providing both in an integrated circuit device very expensive. Alternatively, a solution to this problem could be in using one or another with either higher supply voltage being in the sweet spot for best efficiency using a DC-DC converter, or a low supply voltage being in the sweet spot for best efficiency using a linear regulator. Some integrated circuit devices with DC-DC converters do employ a small keep-alive linear regulator; but again as the name indicates it is only a keep-alive regulated voltage source, not a fully-function linear regulator.

Generally, DC-DC converters, e.g., switched mode buck converters, and linear regulators are kept separate and completely independent as two different voltage regulator circuits. Since the power circuits of these types of voltage regulators carry a large current, they are usually very big in terms of silicon real estate area, therefore internal solutions may, if at all, offer only a very weak linear regulator to save integrated circuit silicon area.

SUMMARY

Hence there is a need for a cost and real estate efficient combination of a DC-DC converter and a linear voltage regulator fabricated on an integrated circuit die and to take advantage of best efficiencies of both voltage regulators depending upon supply voltages available.

According to an embodiment, a voltage regulator may comprise: a power metal oxide semiconductor field effect transistor (MOSFET); and a switching circuit for switching the power MOSFET into a DC-DC regulator circuit in a first operating mode and for switching the power MOSFET into a linear regulator circuit in a second operating mode. According to a further embodiment, the switching circuit may be configured to measure a supply voltage fed to the voltage regulator and may select either the first or the second operating mode based on the measured supply voltage.

According to a further embodiment, may comprise: a first voltage reference; an operational amplifier having a first input coupled to an output of the first voltage reference; wherein the power MOSFET may comprise a P-channel MOSFET (P-MOSFET) adapted as a high-side switch or pass transistor, and having a source coupled to a supply voltage; a power inductor having a first end coupled to a drain of the P-MOSFET; a filter capacitor coupled to a second end of the power inductor and to a second input of the first operational amplifier; first and second signal switches, each having a common, a first position and a second position, wherein the common of the first signal switch may be coupled to an output of the operational amplifier, and a common of the second signal switch may be coupled to a gate of the P-MOSFET; a DC-DC converter may comprise a slope compensation network having an input coupled to the first position of the first signal switch, a first comparator having a first input coupled to an output of the slope compensation network, a pulse width modulation (PWM) generator having an input coupled to an output of the first comparator and an output coupled to the first position of the second signal switch, a timer having an output coupled to the pulse width modulation generator and used to determine a PWM period, a low-side switch coupled to the drain of the P-MOSFET and the first end of the power inductor, and a current sensor coupled to the low-side switch and providing a current signal to a second input of the first comparator; and a linear voltage regulator may comprise an amplifier having an input coupled to the second position of the first signal switch and an output coupled to the second position of the second signal switch; wherein when the first and second signal switches may be in the first positions the DC-DC converter regulates an output voltage on the filter capacitor and the PWM generator controls the P-MOSFET, and when the first and second signal switches may be in the second positions the linear voltage regulator regulates the output voltage on the filter capacitor and the amplifier controls the P-MOSFET.

According to a further embodiment, the low-side switch may be a silicon diode. According to a further embodiment, the silicon diode may be a Schottky diode. According to a further embodiment, the low-side switch may be an N-channel metal oxide semiconductor field effect transistor (N-MOSFET); the PWM generator may comprise complementary outputs; and further may comprise a third signal switch having a common, a first position and a second position, wherein the common may be coupled to a gate of the N-MOSFET, the first position may be coupled to a complementary output of the PWM generator and the second position may be coupled to a power source common. According to a further embodiment, the DC-DC converter may be a synchronous buck DC-DC converter.

According to a further embodiment, a second voltage reference and a second voltage comparator may have a first input coupled to the supply voltage, and a second input coupled to the second voltage reference, wherein the second voltage comparator may control the first and second signal switches, whereby when the supply voltage may be greater than a certain voltage from the second voltage reference the first and second signal switches may be in the first position, and when the supply voltage may be less than or equal to the certain voltage from the second voltage reference the first and second signal switches may be in the second position.

According to a further embodiment, the second voltage comparator has hysteresis. According to a further embodiment, the certain voltage may be an optimal voltage whereby the DC-DC converter may be more efficient than the linear regulator when the supply voltage may be greater than the optimal voltage, and the linear regulator may be more efficient than the DC-DC converter when the supply voltage may be less than or equal to the optimal voltage. According to a further embodiment, the first or second positions of the first and second signal switches may be selected by bonding during integrated circuit package fabrication. According to a further embodiment, the first or second positions of the first and second signal switches may be selected with a jumper. According to a further embodiment, the first or second positions of the first and second signal switches may be selected with a fuse link. According to a further embodiment, the first or second positions of the first and second signal switches may be selected by programming a bit in a register. According to a further embodiment, the first and second signal switches may comprise field effect transistors. According to a further embodiment, the third signal switch may comprise field effect transistors.

According to a further embodiment, a microcontroller may comprise a voltage regulator having a power metal oxide semiconductor field effect transistor (MOSFET); and a switching circuit for switching the power MOSFET into a DC-DC regulator circuit in a first operating mode and for switching the power MOSFET into a linear regulator circuit in a second operating mode. According to a further embodiment, the microcontroller may be configured to measure the supply voltage and select either the first or the second positions of the first and second signal switches based on the measured supply voltage.

According to another embodiment, a method for selecting either a DC-DC converter or linear regulator for best voltage regulation efficiency may comprise the steps of: providing a DC-DC converter having a high-side switch may comprise a metal oxide semiconductor field effect transistor (MOSFET); providing a linear voltage regulator having a series pass transistor may comprise the MOSFET; and comparing a supply voltage to a certain voltage with a voltage comparator, wherein when the supply voltage may be greater than the certain voltage use the DC-DC converter for voltage regulation and when the supply voltage may be less than or equal to the certain voltage use the linear voltage regulator for voltage regulation. According to a further embodiment of the method, the DC-DC converter and linear voltage regulator may share a common voltage reference and operational amplifier of a voltage control loop.

BRIEF DESCRIPTION OF THE DRAWINGS

A more complete understanding of the present disclosure may be acquired by referring to the following description taken in conjunction with the accompanying drawings wherein:

FIG. 1 illustrates a typical schematic diagram of a synchronous buck DC-DC converter;

FIG. 2 illustrates a typical schematic diagram of a linear DC voltage regulator;

Figure 3:
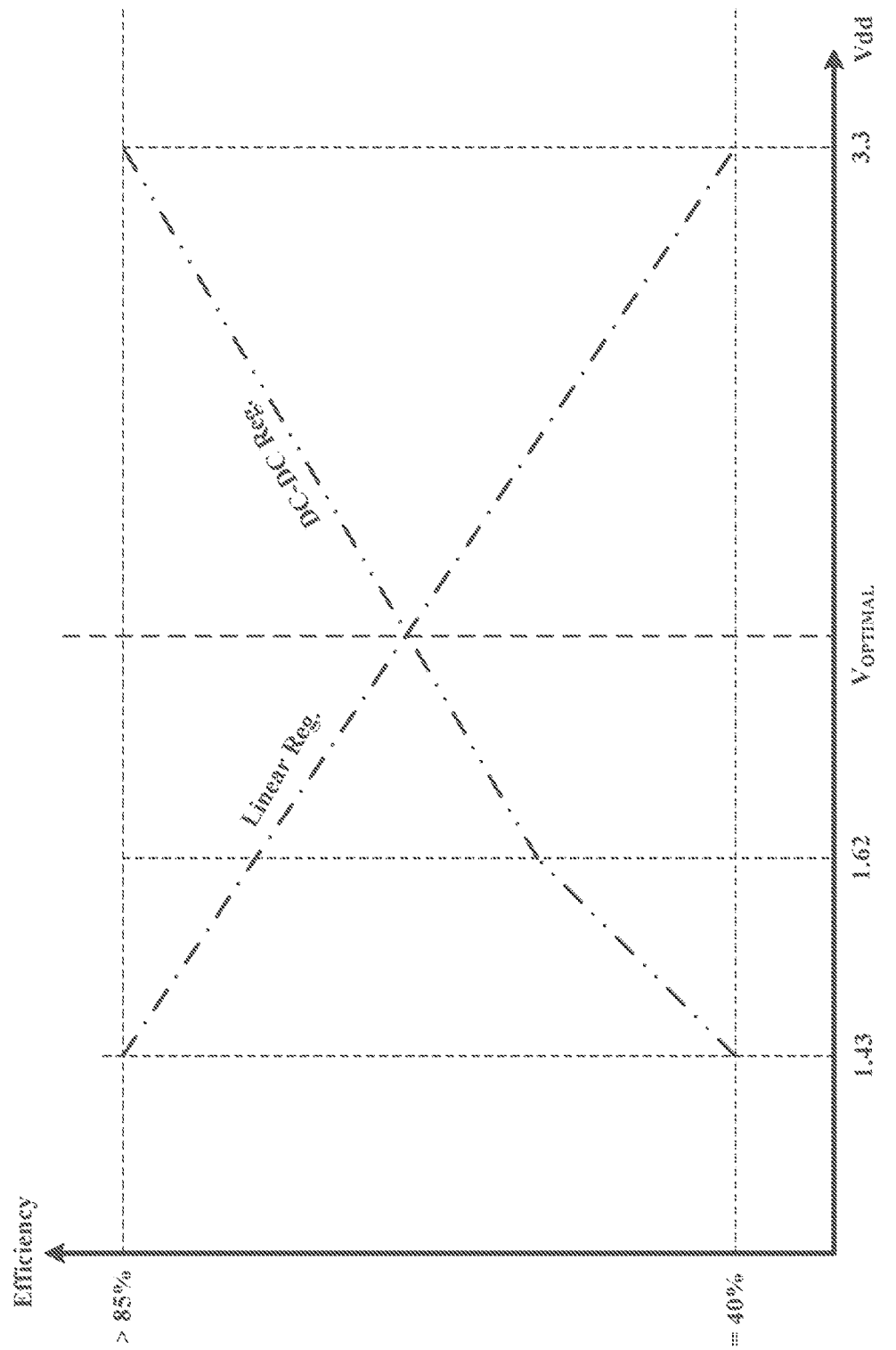
FIG. 3 illustrates schematic graphs of linear and DC-DC regulator efficiencies over a range of supply voltages.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

DETAILED DESCRIPTION

According to various embodiments of this disclosure, a P-MOS transistor may be used as either a switch in a DC-DC converter or as a pass transistor of a linear regulator. When a supply voltage is above a certain voltage, the P-MOS transistor may be used in the DC-DC converter and when below the certain voltage the P-MOS transistor may be used in the linear regulator. The supply voltage may be monitored with a voltage comparator with hysteresis that compares the supply voltage to the certain voltage. Above the certain voltage the DC-DC converter is more efficient than the linear regulator and below the certain voltage the linear voltage regulator is more efficient than the DC-DC converter. The certain voltage may be called the "optimal" voltage for selecting between the DC-DC converter and linear regulator circuit configurations so as to maximize voltage regulation efficiency.

By using the same P-MOS transistor, silicon die area savings for both regulators may be over 40 percent and give an optimal power efficiency for the device across an entire voltage range of, for example is but not limited to, 1.43 to 3.63 volts.

According to another embodiment, selecting either the DC-DC converter or linear regulator may be done by bonding, a jumper, a fuse link or programming a bit for different product applications during integrated circuit package fabrication or end product manufacturing.

Referring now to the drawings, the details of specific example embodiments are schematically illustrated. Like elements in the drawings will be represented by like numbers, and similar elements will be represented by like numbers with a different lower case letter suffix.

Referring now to FIG. 1, depicted is a schematic diagram of a synchronous buck DC-DC converter. The synchronous buck DC-DC converter, generally represented by the numeral 100, may comprise a voltage reference 102, an operational amplifier (OpAmp) 106, a feedback compensation (FB Comp) network 108, a peak current mode control (PCMC) slope compensation network 112, a voltage comparator 114, a timer 116, a complementary output generator (COG) 118, a high-side power switch (P-channel MOSFET) 120, a low-side power switch (N-channel MOSFET) 122, a current measurement sensor (e.g., resistor) 124, a power inductor 126, a filter capacitor 128, voltage divider resistors 132 and 134 to feedback a reduced the output voltage to the FB network 108 and inverting input of the OpAmp 106, and a resistor 130 (e.g., load). Operation of this type of synchronous buck DC-DC converter is well known to those skilled in the art of switched mode power supply design.

A reference voltage from the voltage reference 102 is coupled to the non-inverting input of the OpAmp 106, and a voltage on the filter capacitor 128 is coupled to the FB Comp network 108 which is further coupled to the inverting input of the OpAmp 106. The OpAmp 106 is used as a voltage error amplifier. Sense current from the current measurement sensor 124 is compared with an output from the slope compensation network 112 and the sense current is equal to or greater than the output from the slope compensation network 112 the PWM pulse from the COG 118 controlling the on state of the high-side power switch 120 will terminate. Then the low-side power switch 122 will be turned on to conduct the current from the inductor 126 as the magnetic field around it collapses.

The DC-DC converter circuit shown in FIG. 1 is a typical switched mode power supply (SMPS). Conduction Loss of the PMOS+NMOS transistors loss=$I_{RMS}^2 * R_{DS\_ON}$, wherein $R_{DS\_ON} \propto 1/(VDD-VTH)$. Thus, if VDD goes low, then $R_{DS\_ON}$ goes up. The Switching Loss=$C_{Gate}*VDD*F_{SW}$. Most microcontrollers using such a DC-DC converter have a VDD output voltage in the range of about 2.6-3.63V and have an efficiency greater than 65 percent.

Referring now to FIG. 2, depicted is a schematic diagram of a linear DC voltage regulator. The linear DC voltage regulator may comprise a voltage reference 202, an operational amplifier (OpAmp) 206, a PMOS transistor 220, a filter capacitor 228, voltage divider resistors 232 and 234 to feedback a reduced output voltage to the non-inverting input of the OpAmp 206, and a resistor 230 (e.g., load). The output of the OpAmp 206 controls the gate voltage on the PMOS transistor 220 so as to keep the output voltage, Vout, in accordance with the reference voltage from the voltage reference 202. The PMOS transistor 220 operates in its "saturation" range and therefore dissipates power according to: pass transistor loss=I*(Vs−Vout). Most microcontrollers that use such a linear DC voltage regulator have a voltage range of about 1.62-3.63 volts. Linear regulator efficiency is given by Vout/Vs. Thus, they are not efficient at higher supply voltages.

Referring now to FIG. 3, depicted are schematic graphs of linear and DC-DC regulator efficiencies over a range of supply voltages. The linear regulator has a higher efficiency than the DC-DC regulator at the lower supply voltage ranges, e.g., below $V_{OPTIMAL}$, and the DC-DC regulator has a higher efficiency than the linear regulator above $V_{OPTIMAL}$. Ideally using a linear regulator below $V_{OPTIMAL}$ and a DC-DC regulator above $V_{OPTIMAL}$ is desired. Therefore, one needs both regulators in a design, but results in an expensive solution with respect to silicon area required. Typically for a product design either the linear regulator or the DC-DC regulator with a keep-alive linear regulator is chosen, but the keep-alive linear regulator results in very limited support of a power supply voltage range. As mentioned above, over fifty (50) percent of silicon area of these regulators is used by its pass/switch transistor.

Figure 4:
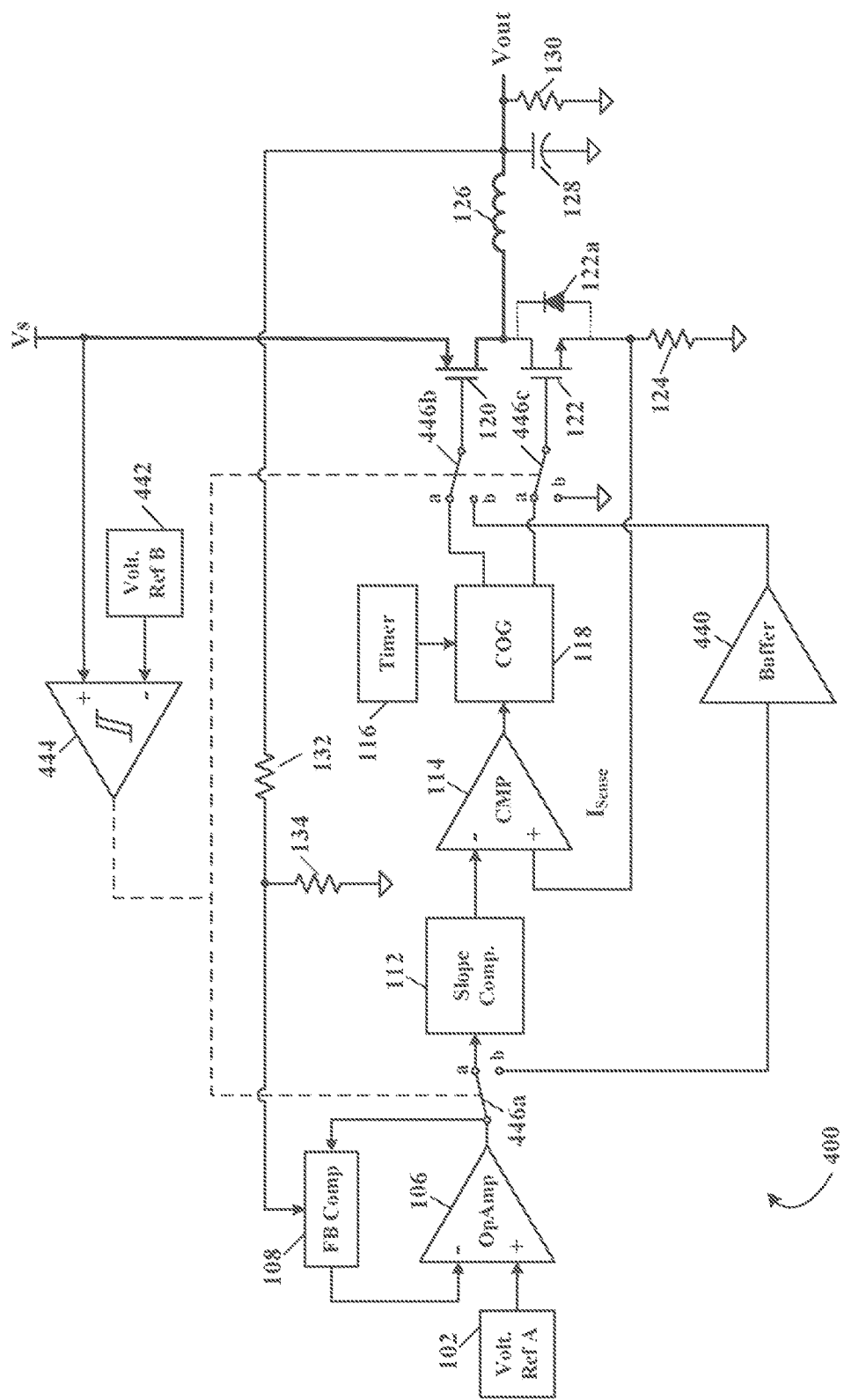
FIG. 4 illustrates a schematic representation diagram of a synchronous buck DC-DC converter and a linear DC voltage regulator using a common PMOS power transistor, some other common components and automatic switching between voltage regulation by the DC-DC converter or the linear DC voltage regulator based upon a supply voltage connected thereto, according to a specific example embodiment of this disclosure.

Referring now to FIG. 4, depicted is a schematic diagram of a synchronous buck DC-DC converter and a linear DC voltage regulator using a common PMOS power transistor, some other common components and automatic switching between voltage regulation by the DC-DC converter or the linear DC voltage regulator based upon a supply voltage connected thereto, according to a specific example embodiment of this disclosure. A synchronous buck DC-DC converter and linear DC voltage regulator using a common PMOS power transistor, generally represented by the numeral 400, may comprise a first voltage reference 102, an operational amplifier (OpAmp) 106, a feedback compensation (FB Comp) network 108, a peak current mode control (PCMC) slope compensation network 112, a first voltage comparator 114, a timer 116, a complementary output generator (COG) 118, a high-side power switch (P-channel MOSFET) 120, a low-side power switch 122, a current measurement sensor (e.g., resistor) 124, a power inductor 126, a filter capacitor 128, voltage divider resistors 132 and 134 to feedback a reduced output voltage to the FB network 108 and inverting input of the OpAmp 106, a resistor 130 (e.g., load), a buffer amplifier 440, a second voltage comparator 444, preferably with hysteresis; a second voltage reference 442, and converter/regulator selection switches 446. The low-side power switch 122 may be a silicon diode 122a, e.g., Schottky diode, or power N-channel MOSFET. The N-Channel MOSFET would be more efficient in this application, but both diodes and NMOS transistors are contemplated herein. Switch 446c is not needed when the diode 122a is used instead of the low-side power switch 122.

A first reference voltage from the first voltage reference 102 is coupled to the non-inverting input of the OpAmp 106, and a voltage on the filter capacitor 128 is coupled to the FB Comp network 108 which is further coupled to the inverting input of the OpAmp 106. The OpAmp 106 may be used as a voltage error amplifier. The first reference voltage determines the voltage value of Vout with either the DC-DC converter or the linear regulator in operation as more fully described hereinafter.

The second reference voltage from the second voltage reference 442 is set at a voltage value so that the second voltage comparator 444 will control the switches 446 for operation of the DC-DC converter when the supply voltage, Vs, is greater than the optimal voltage (FIG. 3), or operation of the linear regulator when the supply voltage, Vs, is less than or equal to the optimal voltage (FIG. 3). Hysteresis switching may also be provided in the comparator 444 so that the DC-DC converter and linear regulator operations are not being switched back and forth unnecessarily.

When the supply voltage, Vs, is greater than the optimal voltage the second voltage comparator 444 causes the switches 446 to be in position "a", the DC-DC converter function is selected and it will operate in the same way as the DC-DC converter 100 described above and shown in FIG. 1. When the supply voltage, Vs, is less than or equal to the optimal voltage the second voltage comparator 444 causes the switches 446 to be in position "b", the linear regulator function is selected and it will operate in the same way as the linear regulator described above and shown in FIG. 2. The gain of the buffer amplifier 440 may be selected so that no changes are necessary to the operating parameters of the OpAmp 106 when used in the DC-DC converter or linear regulator operations. The buffer amplifier 440 may also be provided as an inverter or non-inverting buffer amplifier depending upon circuit operational requirements.

When switch 446a is in position "a" couples the output of the OpAmp 106 to the slope compensation network 112. When switches 446b and 446c are in position "a" the gates of the PMOS transistor 120 and NMOS transistor 122 are coupled to the complementary outputs of the COG 118. When switch 446a is in position "b" the output of the OpAmp 106 is coupled to the input of the buffer amplifier 440. When switches 446b and 446c are in position "b" the gate of the PMOS transistor 120 is coupled to the output of the buffer amplifier 440, and the gate of the NMOS transistor 122 is coupled to common (ground) or bias voltage which effectively either turns off the NMOS transistor 122 or makes it a bias current source. When the linear regulator function is selected the inductor 126 effectively does nothing but acts as a series connected low resistance. These aforementioned operations result in power-optimal voltage regulation across an entire supply range, e.g., 1.43-3.63 volts. It is contemplated and within the scope of this disclosure that the switches 446 may be implemented using metal oxide semiconductor field effect transistors (MOSFETs) as signal switching multiplexers. Using MOSFETs as such is well known to those having ordinary skill in integrated circuit design and having the benefit of this disclosure.

Using a microcontroller (not shown), there are various resources available to monitor the supply voltage. According to various embodiments, when the supply voltage is above a certain voltage (e.g., optimal voltage) circuits in the microcontroller will switch to the DC-DC converter, "switching regulator mode" and use the PMOS transistor 120 as an ON/OFF switch in a buck mode SMPS configuration, and when the supply voltage is below a certain voltage (e.g., optimal voltage) circuits in the microcontroller will switch to the "linear regulator mode" and use the PMOS transistor 120 as a voltage controlled series connected pass transistor. This results in unique voltage regulation circuitry that provides for efficiency optimized voltage regulation. The proposed circuit disclosed and claimed herein guarantees maximum voltage regulation efficiency across an entire range of supply voltages, Vs, e.g., 1.43 to 3.63 volts. The switches 446 may also be controlled using bonding, a jumper, a fuse link or programming a bit to select either the DC-DC converter or linear regulator for different product applications during integrated circuit package fabrication or end product manufacturing.

The invention claimed is:

1. A voltage regulator comprising:
   a power metal oxide semiconductor field effect transistor (MOSFET);
   a first voltage reference;
   an operational amplifier having a first input coupled to an output of the first voltage reference;
   wherein the power MOSFET comprises a P-channel MOSFET (P-MOSFET) adapted as a high-side switch or pass transistor, and having a source coupled to a supply voltage;
   a power inductor having a first end coupled to a drain of the P-MOSFET;
   a filter capacitor coupled to a second end of the power inductor and to a second input of the first operational amplifier;
   first and second signal switches, each having a common, a first position and a second position, wherein the common of the first signal switch is coupled to an output of the operational amplifier, and a common of the second signal switch is coupled to a gate of the P-MOSFET;
   a DC-DC converter comprising:
      a slope compensation network having an input coupled to the first position of the first signal switch,
      a first comparator having a first input coupled to an output of the slope compensation network,
      a pulse width modulation (PWM) generator having an input coupled to an output of the first comparator and an output coupled to the first position of the second signal switch,
      a timer having an output coupled to the pulse width modulation generator and used to determine a PWM period,
      a low-side switch coupled to the drain of the P-MOSFET and the first end of the power inductor, and
      a current sensor coupled to the low-side switch and providing a current signal to a second input of the first comparator; and
   a linear voltage regulator comprising:
      an amplifier having an input coupled to the second position of the first signal switch and an output coupled to the second position of the second signal switch;
   wherein when the first and second signal switches are in the first positions the DC DC converter regulates an output voltage on the filter capacitor and the PWM generator controls the P-MOSFET, and when the first and second signal switches are in the second positions the linear voltage regulator regulates the output voltage on the filter capacitor and the amplifier controls the P-MOSFET.

2. The voltage regulator according to claim 1, wherein the voltage regulator is configured to measure a supply voltage fed to the voltage regulator and select either a first or a second operating mode based on the measured supply voltage thereby enabling said DC-DC converter or said linear converter, respectively.

3. The voltage regulator according to claim 1, wherein the low-side switch is a silicon diode.

4. The voltage regulator according to claim 1, wherein the silicon diode is a Schottky diode.

5. The voltage regulator according to claim 1, wherein:
   the low-side switch is an N-channel metal oxide semiconductor field effect transistor (N-MOSFET);
   the PWM generator comprises complementary outputs; and
   further comprising a third signal switch having a common, a first position and a second position, wherein the common is coupled to a gate of the N-MOSFET, the first position is coupled to a complementary output of the PWM generator and the second position is coupled to a power source common.

6. The voltage regulator according to claim 5, wherein the DC-DC converter is a synchronous buck DC-DC converter.

7. The voltage regulator according to claim 6, wherein the third signal switch comprises field effect transistors.

8. The voltage regulator according to claim 1, further comprising:
   a second voltage reference; and
   a second voltage comparator having a first input coupled to the supply voltage and a second input coupled to the second voltage reference, wherein the second voltage comparator controls the first and second signal switches, whereby when the supply voltage is greater than a certain voltage from the second voltage reference the first and second signal switches are in the first position, and when the supply voltage is less than or equal to the certain voltage from the second voltage reference the first and second signal switches are in the second position.

9. The voltage regulator according to claim 8, wherein the second voltage comparator has hysteresis.

10. The voltage regulator according to claim 8, wherein the certain voltage is an optimal voltage whereby the DC-DC converter is more efficient than the linear regulator when the supply voltage is greater than the optimal voltage, and the linear regulator is more efficient than the DC-DC converter when the supply voltage is less than or equal to the optimal voltage.

11. The voltage regulator according to claim 1, wherein the first or second positions of the first and second signal switches are selected by bonding during integrated circuit package fabrication.

12. The voltage regulator according to claim 1, wherein the first or second positions of the first and second signal switches are selected with a jumper.

13. The voltage regulator according to claim 1, wherein the first or second positions of the first and second signal switches are selected with a fuse link.

14. The voltage regulator according to claim 1, wherein the first or second positions of the first and second signal switches are selected by programming a bit in a register.

15. The voltage regulator according to claim 1, wherein the first and second signal switches comprises field effect transistors.

16. A microcontroller comprising a voltage regulator according to claim 1.

17. The microcontroller according to claim 16, wherein the microcontroller is configured to measure the supply voltage and select either the first or the second positions of the first and second signal switches based on the measured supply voltage.

18. A method for selecting either a DC-DC converter or linear regulator for best voltage regulation efficiency, said method comprising the steps of:
providing a DC-DC converter having a high-side switch comprising a metal oxide semiconductor field effect transistor (MOSFET);
providing a linear voltage regulator having a series pass transistor formed only by the MOSFET,
providing an error amplifier receiving a reference voltage and a feedback voltage for use of the DC-DC converter and the linear voltage regulator; and
comparing a supply voltage to a certain voltage with a voltage comparator, wherein when the supply voltage is greater than the certain voltage use the DC-DC converter for voltage regulation in a first operating mode, wherein a first switching unit is controlled to couple the output of the error amplifier with an input of the DC-DC converter and a second switching unit is controlled to couple the gate of the MOSFET with a first output of the DC-DC converter and controlling another MOSFET coupled in series with the MOSFET by a second output of the DC-DC converter; and
when the supply voltage is less than or equal to the certain voltage use the linear voltage regulator for voltage regulation in a second operating mode, wherein the first switching unit is controlled to couple an output of the error amplifier with an input of a buffer amplifier of the linear voltage regulator and the second switching unit is controlled to couple a gate of the MOSFET with an output of said buffer amplifier.

19. The method according to claim 18, further comprising controlling the another MOSFET to be in a non-conductive state when operating in the second operating mode.

20. A voltage regulator comprising:
a DC-DC converter having a high-side switch comprising a metal oxide semiconductor field effect transistor (MOSFET);
a linear voltage regulator having a series pass transistor formed only by the MOSFET,
an error amplifier receiving a reference voltage and a feedback voltage; and
wherein the voltage regulator is configured to compare a supply voltage to a certain voltage with a voltage comparator, wherein
in a first operating mode when the supply voltage is greater than the certain voltage the voltage regulator is configured to use the DC-DC converter, the error amplifier and the MOSFET for voltage regulation, wherein the voltage regulator is configured to control a first switching unit to couple the output of the error amplifier with an input of the DC-DC converter and to control a second switching unit to couple the gate of the MOSFET with a first output of the DC-DC converter and to control another MOSFET coupled in series with the MOSFET by a second output of the DC-DC converter; and
in a second operating mode, when the supply voltage is less than or equal to the certain voltage the voltage regulator is configured to use the linear voltage regulator, the error amplifier and the MOSFET for voltage regulation, wherein the voltage regulator is configured to control the first switching unit to couple an output of the error amplifier with an input of a buffer amplifier of the linear voltage regulator and to control the second switching unit to couple a gate of the MOSFET with an output of said buffer amplifier.

21. The voltage regulator according to claim 20, the voltage regulator is further configured to control the another MOSFET to be in a non-conductive state when operating in the second operating mode.

* * * * *